US012610105B2

(12) United States Patent
Kikuchi

(10) Patent No.: US 12,610,105 B2
(45) Date of Patent: Apr. 21, 2026

(54) LIVE DISTRIBUTION FOR COMPILING ACTION OF VIEWER OF VIDEO

(71) Applicant: Rakuten Group, Inc., Tokyo (JP)

(72) Inventor: Ko Kikuchi, Tokyo (JP)

(73) Assignee: Rakuten Group, Inc., Tokyo (JP)

( * ) Notice: Subject to any disclaimer, the term of this patent is extended or adjusted under 35 U.S.C. 154(b) by 0 days.

(21) Appl. No.: 18/008,612

(22) PCT Filed: Aug. 1, 2022

(86) PCT No.: PCT/JP2022/029475

§ 371 (c)(1),
(2) Date: Dec. 6, 2022

(87) PCT Pub. No.: WO2024/028943

PCT Pub. Date: Feb. 8, 2024

(65) Prior Publication Data

US 2025/0168450 A1    May 22, 2025

(51) Int. Cl.
*H04N 21/442* (2011.01)
*H04N 21/254* (2011.01)
*H04N 21/478* (2011.01)

(52) U.S. Cl.
CPC ..... *H04N 21/44224* (2020.08); *H04N 21/254* (2013.01); *H04N 21/47815* (2013.01)

(58) Field of Classification Search
CPC ........... H04N 21/254; H04N 21/44224; H04N 21/47815
See application file for complete search history.

(56) References Cited

U.S. PATENT DOCUMENTS 11,134,316 B1 *   9/2021   Pavlosky ......... H04N 21/47815
2008/0104656 A1 *   5/2008   Kim ................... H04N 21/4334
386/E9.013

(Continued)

FOREIGN PATENT DOCUMENTS

JP     2009-038420 A     2/2009
JP     2018-026152 A     2/2018

(Continued)

OTHER PUBLICATIONS

International Search Report for PCT/JP2022/029475 dated Oct. 25, 2022 [PCT/ISA/210].

*Primary Examiner* — Nicholas T Corbo
(74) *Attorney, Agent, or Firm* — Sughrue Mion, PLLC

(57) ABSTRACT

A compilation system (101) includes: a plurality of viewing terminals (104) with which a plurality of viewers respectively views a video; and a compilation server (105). Each terminal (104) of the viewing terminals, using at least one processor of one or more processors in the terminal (104), enables a viewer using the terminal (104) to view one of one or more contents associated with the video in advance while the video is being played in the terminal (104). The compilation server (105), using at least one processor of one or more processors in the compilation server (105), collects whether either one of one or more contents is being browsed while the video is being played in each terminal (104) of the viewing terminals. The compilation server (105) compiles a trend in the numbers of viewers, among the viewers, who have been browsing respective content of one or more contents at certain playback times of the video.

9 Claims, 15 Drawing Sheets

(56) References Cited

U.S. PATENT DOCUMENTS

| | | | | |
|---|---|---|---|---|
| 2015/0073936 A1* | 3/2015 | Peterson | ............ | G06Q 30/0282 |
| | | | | 705/26.9 |
| 2015/0128162 A1* | 5/2015 | Ionescu | ............. | H04N 21/2668 |
| | | | | 725/14 |
| 2017/0195730 A1* | 7/2017 | Das | .................... | H04N 21/6543 |
| 2018/0176645 A1* | 6/2018 | Reyes Sanchez | ...... | H04H 60/66 |
| 2019/0090025 A1* | 3/2019 | Chesson | ............. | H04N 21/466 |

FOREIGN PATENT DOCUMENTS

| | | |
|---|---|---|
| JP | 2019-109785 A | 7/2019 |
| JP | 2021-087034 A | 6/2021 |

* cited by examiner

| ACTION LIST OF VIDEO P | |
|---|---|
| WEB PAGE A | PRODUCT PRESENTATION PAGE |
| STATUS UPDATE | ADDITION TO ELECTRONIC CART |
| WEB PAGE B | SETTLEMENT COMPLETION PAGE |

FIG.8

| PLAYBACK TIME | ACCOUNT | ACTION |
|---|---|---|
| 12:50:00 | x | WEB PAGE A |
| 12:51:25 | y | WEB PAGE A |
| 12:51:26 | x | STATUS UPDATE |
| 12:52:55 | x | WEB PAGE B |
| 12:53:01 | z | WEB PAGE A |
| 12:53:10 | y | STATUS UPDATE |
| 12:53:22 | y | WEB PAGE B |
| 12:53:25 | z | STATUS UPDATE |
| 12:54:12 | z | WEB PAGE B |
| ⋮ | ⋮ | ⋮ |

LIVE DISTRIBUTION FOR COMPILING ACTION OF VIEWER OF VIDEO

CROSS REFERENCE TO RELATED APPLICATION

This application is a National Stage of Application No. PCT/JP2022/029475 filed Aug. 1, 2022.

TECHNICAL FIELD

The present disclosure relates to live distribution for compiling actions of viewers of a video.

BACKGROUND ART

In association with change in lifestyle, a sales form of a product or a service, or goods or services referred to as live commerce has drawn increasing attention. In the live commerce, a streamer distributes a video presenting a specific product or the like and a viewer who is viewing the distribution is able to purchase the product or the like online.

For example, in Patent Literature 1, a system assisting trade in live commerce by allowing a distribution user to present a specific product online and rewarding the distribution user according to the amount of purchase of the presented product is disclosed.

CITATION LIST

Patent Literature

Patent Literature 1: Unexamined Japanese Patent Application Publication No. 2018-26152

SUMMARY OF INVENTION

Technical Problem

Since, in many systems providing live commerce, streamers are able to get a reward according to the amount of purchase of products or the like by viewers as in the system disclosed in Patent Literature 1, the streamers devise a method for presenting a product or the like every day through trial and error in such a way as to increase the amount of purchase. The streamers perform distribution, considering what type of communication style leads to increase in the amount of purchase or decrease in the amount of purchase. Such streamers have expressed desire to know detailed responses of viewers to promotion by the streamers.

The present disclosure has been made to solve the above-described problem, and an objective of the present disclosure is to provide a technology for grasping a trend of actions taken by viewers who are viewing live distribution.

Solution to Problem

A compilation system according to a first aspect of the present disclosure includes a plurality of viewing terminals with which a plurality of viewers respectively views a video and a compilation server.

Each terminal of the plurality of viewing terminals, using at least one processor of one or more processors that the terminal includes, enables a viewer using the terminal to view one of one or more contents associated with the video in advance while the video is being played in the terminal.

The compilation server, using at least one processor of one or more processors that the compilation server includes, collects whether either one of the one or more contents is being browsed while the video is being played in each terminal of the plurality of viewing terminals. The compilation server compiles a trend in the numbers of viewers, among the plurality of viewers, who have been browsing respective content of the one or more contents at certain playback times of the video.

A compilation server according to a second aspect of the present disclosure is connected in a communicable manner to each terminal of a plurality of viewing terminals with which a plurality of viewers respectively views a video.

The compilation server includes one or more processors and, using at least one processor of the one or more processors, collects whether either one of one or more contents associated with the video in advance is being browsed while the video is being played in each terminal of the plurality of viewing terminals. The compilation server compiles a trend in the numbers of viewers, among the plurality of viewers, who have been browsing respective content of the one or more contents at certain playback times of the video.

A compilation method according to a third aspect of the present disclosure includes, in a compilation system including a plurality of viewing terminals with which a plurality of viewers respectively views a video and a compilation server, each terminal of the plurality of viewing terminals enabling a viewer using the terminal to view one of one or more contents associated with the video in advance while the video is being played in the terminal.

In addition, the compilation method includes the compilation server collecting whether either one of the one or more contents is being browsed while the video is being played in each terminal of the plurality of viewing terminals. The compilation method further includes the step of the compilation server compiling a trend in the numbers of viewers, among the plurality of viewers, who have been browsing respective content of the one or more contents at certain playback times of the video.

Advantageous Effects of Invention

The present disclosure enables a trend of actions taken by viewers viewing live distribution to be grasped.

BRIEF DESCRIPTION OF DRAWINGS

FIG. 3 is an explanatory diagram illustrating an example of an action list;

FIG. 8 is an explanatory diagram illustrating an example of reports that a compilation server receives;

DESCRIPTION OF EMBODIMENTS

Embodiment 1

Figure 1:
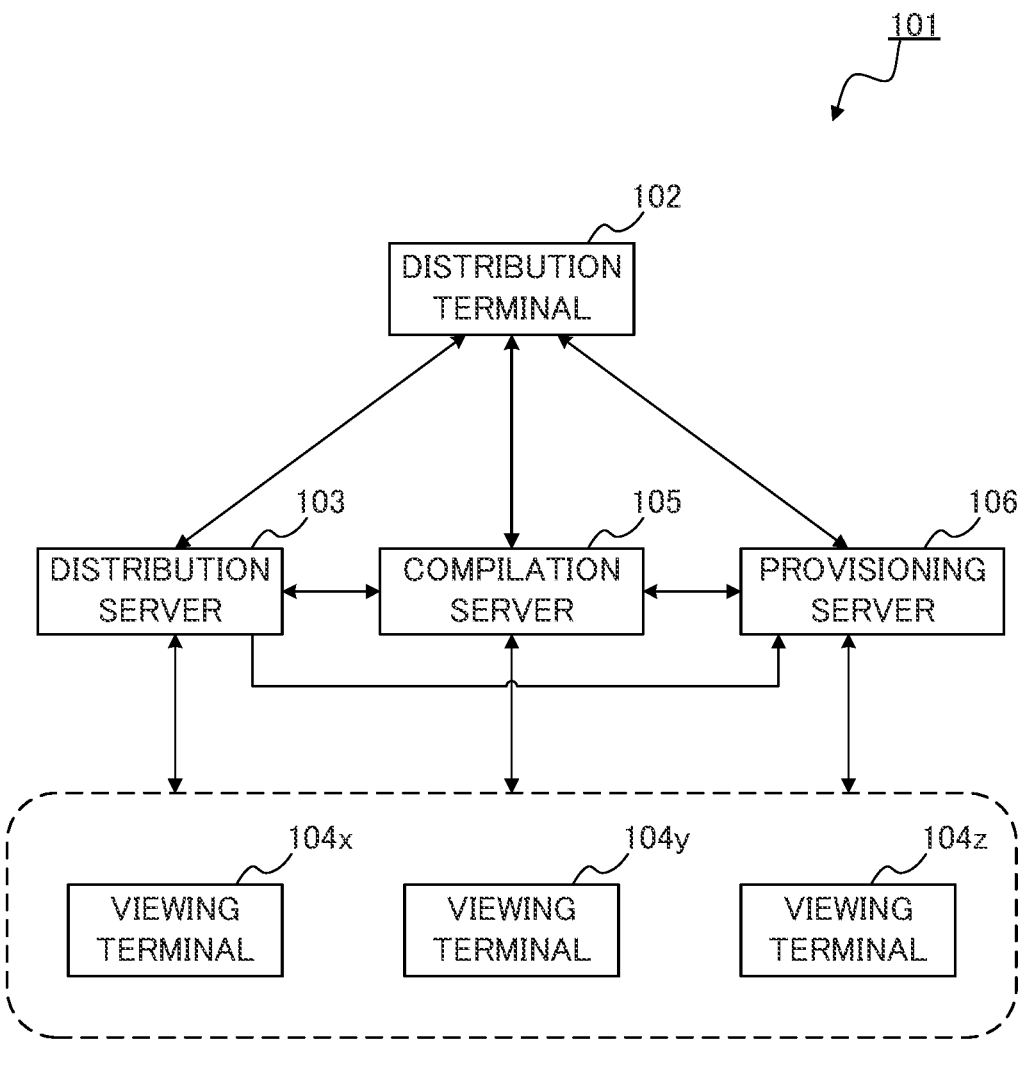
FIG. 1 is an explanatory diagram illustrating collaboration among devices that achieve a compilation system.

Embodiment 1 of the present disclosure is described below. Note that the present embodiment is for explaining the present disclosure, not for limiting the scope of the present disclosure. Accordingly, it is possible for a person skilled in the art to employ embodiments in which part or all of the elements of the present embodiment are replaced by equivalents thereof, which are also included in the scope of the present disclosure.

(Relationship between Terminals and Servers and Programs)

A compilation system according to the present embodiment is for providing data obtained by compiling a trend of actions taken by viewers who are viewing live distribution in a distribution system of a live video. In the compilation system according to the present embodiment, one or a plurality of servers provide statistics of actions taken by viewers who are viewing a live distribution, in collaboration with terminals, such as a smartphone, a tablet computer, and a personal computer.

Although each of the servers and terminals in the present embodiment is generally achieved by causing a computer to execute a program, processing of the server or terminal can also be executed by a dedicated electronic circuit.

In addition to this, each of the servers and terminals in the present embodiment can also be configured by applying, as an intermediate form of a computer and a dedicated electronic circuit, a technology, such as a field programmable gate array (FPGA), in which a program is compiled into a design script to design an electronic circuit and the electronic circuit is dynamically configured based on the design script.

Each of the servers according to the present embodiment is achieved by one or a plurality of server computers, which communicates with a terminal accepting a command such as access to a video distribution site, executing respective functions that are achieved by one or a plurality of server programs.

Each of the terminals according to the present embodiment is a terminal computer that achieves a smartphone or the like and can be achieved by executing a terminal program that is provided by a service provider or an operator of a distribution service through a distribution server or the like.

As a terminal program, a program equivalent to a so-called "app" can be employed.

In addition to this, a general browser can be employed as a terminal program, and a script program operating in a browser can also be employed as a terminal program.

In these cases, apps or browsers operating in terminal computers serve as interfaces for compiling a trend of actions of viewers who are viewing a video using the terminals, by communicating with servers in the compilation system, which function as an app server and a web server.

In general, a program to be executed in a server computer or a terminal computer can be recorded in a non-transitory computer-readable information recording medium, such as a compact disc, a flexible disk, a hard disk, a magneto optical disk, a digital video disc, a magnetic tape, a read only memory (ROM), an electrically erasable programmable ROM (EEPROM), a flash memory, and a semiconductor memory. The information recording medium can be distributed and sold independently of a server computer and a terminal computer.

In each of the server computers and the terminal computers, a program recorded in a non-transitory information recording medium, such as a flash memory and a hard disk, is read into a random access memory (RAM), which is a temporary storage device, and subsequently a central processing unit (CPU) executes commands included in the read program. Note, however, that, in an architecture that allows a ROM and a RAM to be mapped to a single memory space in which a program can be executed, a CPU directly reads and executes commands included in a program stored in the ROM.

Further, the server programs and the terminal programs can be distributed and sold from a distribution server, which the service provider manages, or the like to server computers and terminal computers via a transitory transmission medium, such as a computer communication network, independently of a computer in which the programs are executed.

Note that, when a server included in the compilation system is constituted by a plurality of computers, programs operating in the respective computers are considered as a plurality of server programs that is different from one another and, while having functions different from one another, collaborates with one another. Therefore, a program into which the plurality of programs is combined can be considered as a system program to achieve the compilation system.

Hereinafter, in the present embodiment, the description is made using a video distribution service used in so-called live commerce as an example. The compilation system according to the present embodiment compiles a trend of actions of viewers who are viewing a live video related to live commerce and provides statistics of the trend. As used herein, examples of the actions of viewers include searching an electronic market for a product or the like presented in a live video, adding a product or the like to a so-called electronic cart, and purchasing a product or the like in the electronic market. In addition, the live video is a video that a streamer distributes and that is further distributed to a viewer in real time. A streamer may present a product or the like or present a plurality of products or the like in a live video.

(Overall Configuration)

FIG. 1 is an explanatory diagram illustrating collaboration among devices that achieve the compilation system of the present embodiment. A compilation system 101 illustrated in the present drawing includes a distribution terminal 102, a distribution server 103, viewing terminals 104x, 104y, and 104z, a compilation server 105, and a provisioning server 106. The above-described devices are connected to one another in a communicable manner via a computer communication network, such as the Internet. Note that, in the present embodiment, each of the viewing terminals 104*x*, 104*y*, and 104*z* is sometimes simply referred to as a viewing terminal 104.

The distribution terminal 102 is a terminal that a streamer who distributes a live video uses, and distributes a video that the streamer captured, created, edited, and the like to the viewing terminals 104*x* to 104*z* via the distribution server 103. In addition, the distribution terminal 102 receives statistics relating to actions of viewers from the compilation server 105 and presents the received statistics to the streamer.

The distribution server 103 distributes a live video, which the distribution terminal 102 distributes, to the viewing terminals 104*x* to 104*z*.

Each of the viewing terminals 104*x* to 104*z* is a terminal that a viewer uses, and plays a distributed live video. In addition, each of the viewing terminals 104*x* to 104*z* accesses the provisioning server 106 in response to an operation performed by a viewer and receives provision of a content during playback of a live video.

The compilation server 105 compiles a trend of actions of viewers who are viewing a live video. The compilation server 105 provides the distribution terminal 102 with statistics relating to actions of viewers, which are a compilation result, in response to a request from the streamer.

The provisioning server 106 provides contents related to an electronic market for trading products and the like. In the electronic market, a product or the like that is presented in a live video distributed from the distribution server 103 is sold. Examples of the contents include a web page in the electronic market. In addition, a content can have a specific status. Examples of the specific status include whether or not a product or a service is added to an electronic cart.

(Transmission and Reception of Data between Terminal and Server)

Figure 2:
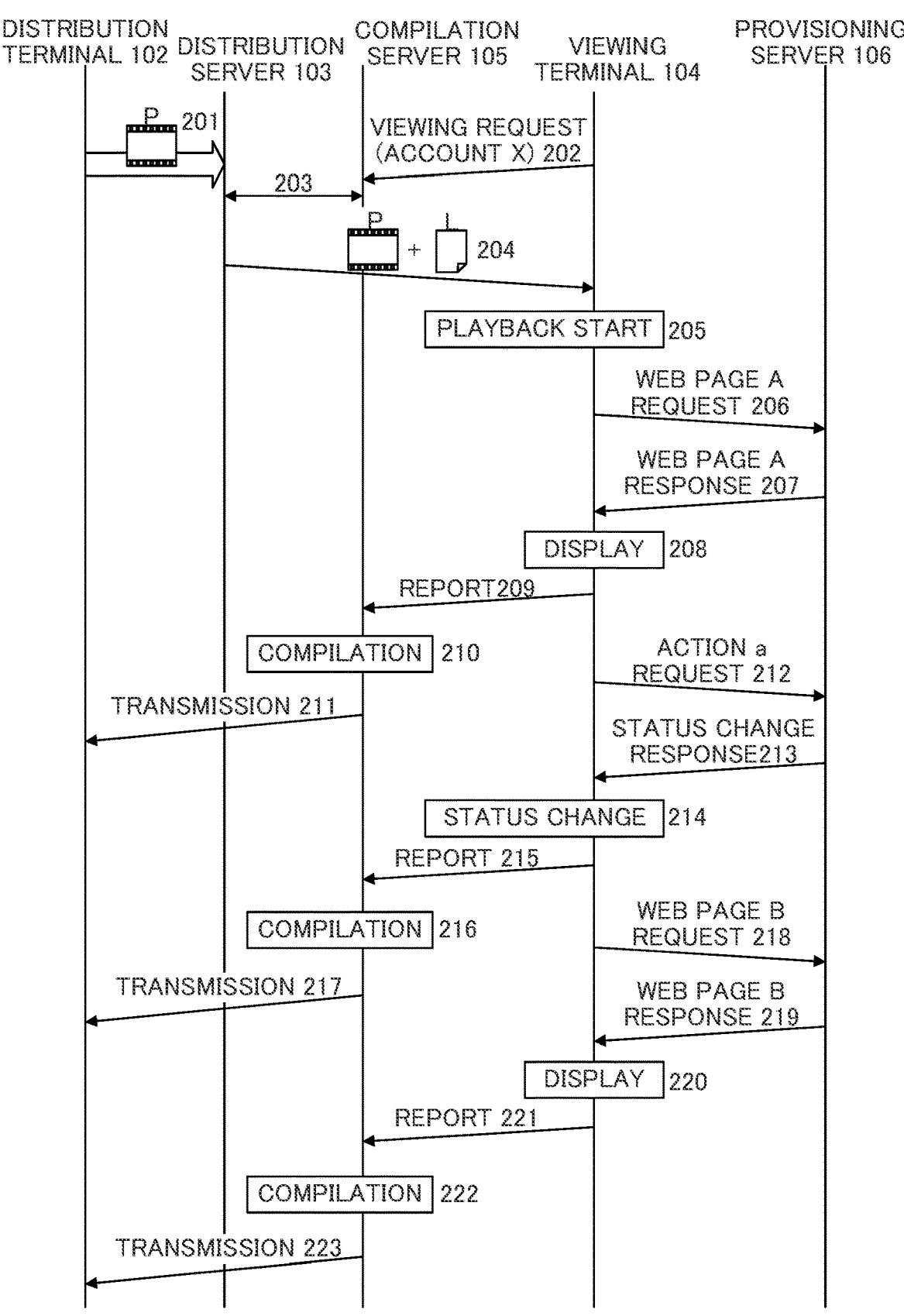
FIG. 2 is a session diagram illustrating a manner in which data are exchanged between terminals and servers in Embodiment 1.

FIG. 2 is a session diagram illustrating a manner in which, in the compilation system 101, data are exchanged when a viewer who is viewing a live video browses a web page or the like associated with a product or the like presented in the live video.

In the present embodiment, the streamer presents one or more products or the like for the purpose of sales promotion in a video that the streamer himself/herself distributes. The streamer always considers what kind of appeal can promote purchase motivation of viewers and desires to know what type of action viewers are to take caused by promotion by the streamer himself/herself.

In the present embodiment, the compilation system 101 compiles, with respect to each of three actions that a viewer takes during playback of a video, a trend in the numbers of viewers who have taken the action, and provides the streamer with the trend. It is assumed that the three actions are, by accessing the provisioning server 106, "having browsed a presentation page of a product or the like presented in a video", "having added the product or the like to an electronic cart", and "having browsed a settlement completion page including the product or the like". Herein, the "presentation page of a product or the like" is referred to as a web page A, "addition of a product or the like to an electronic cart" is referred to as an action a or a status change, and the "settlement completion page including a product or the like" is referred to as a web page B. Information about the above-described actions of viewers to be compiled is associated with the video, and the distribution server 103 holds the information as an action list L as illustrated in FIG. 3. The streamer, by operating the distribution terminal 102, notifies the distribution server 103 of an action list L before starting distribution of a video.

In addition, in the present embodiment, an account x, an account y, and an account z are associated with a viewer who use the viewing terminal 104*x*, a viewer who uses the viewing terminal 104*y*, and a viewer who uses the viewing terminal 104*z*, respectively. User information about viewers who use the viewing terminals 104 is registered in advance and recorded in the distribution server 103, the compilation server 105, and the provisioning server 106. In the user information, an account, a name, an address, a phone number, information about settlement, and the like of each user are included.

In addition, in Embodiment 1, it is assumed that a viewer performs playback of a video and browsing or the like of a content, using the same app. Based on the above-described assumption, the following description is made with reference to FIG. 2.

First, the distribution terminal 102 distributes a video P to the distribution server 103 in response to an operation performed by the streamer (201). The video P may be a video being streamed live or a video having been created in advance.

A viewing terminal 104 sends a viewing request to view the video P to the compilation server 105 in response to an operation by a viewer (202). In the viewing request, the account of the viewer using the viewing terminal 104, for example, the account x, is specified.

When the compilation server 105 receives the viewing request, the compilation server 105 identifies the video P and an action list L thereof, which are to be distributed to the viewing terminal 104, in collaboration with the distribution server 103 (203). Subsequently, the distribution server 103 distributes the identified video P and sends the identified action list L to the viewing terminal 104 (204).

When the viewing terminal 104 receives distribution of the video P from the distribution server 103, the viewing terminal 104 starts playing the video P (205).

In each terminal of the viewing terminals 104*x* to 104*z*, a viewer who uses the terminal is able to browse one of one or more contents that are associated with the video P in advance, while the video P is being played. When the viewer, operating the viewing terminal 104, requests display of a web page A, which is a presentation page of a product or the like presented in the video P, the viewing terminal 104 sends a request specifying the web page A to the provisioning server 106 (206).

When the provisioning server 106 receives the request specifying the web page A from the viewing terminal 104, the provisioning server 106 identifies the web page A and sends a response specifying the web page A to the viewing terminal 104 (207).

When the viewing terminal 104 receives the response specifying the web page A, the viewing terminal 104 displays the web page A (208).

The compilation server 105 collects which one of one or more contents that the provisioning server 106 provides is browsed, or whether either one of the one or more contents that the provisioning server 106 provides is being browsed, while the video P is being played in each terminal of the viewing terminals 104*x* to 104*z*. In Embodiment 1, when the viewing terminal 104 detects that one of the one or more contents associated with the video P in advance is browsed, or being browsed, while the video P is being played, the viewing terminal 104 sends a report in which the detected content is specified to the compilation server 105. That is, the viewing terminal 104 searches the action list L, and, since the web page A that is currently being displayed is a content included in the action list L, the viewing terminal 104 sends a report specifying the web page A to the compilation server 105 (209).

The compilation server 105 compiles a trend in the numbers of viewers, among the plurality of viewers, who were browsing each content among the one or more contents at respective playback times of the video P, or who have been browsing respective content of the one or more contents at certain playback time of the video P. In Embodiment 1, the compilation server 105 receives reports sent from the plurality of viewing terminals 104x to 104z and compiles a trend in the numbers of viewers, among the plurality of viewers, who were browsing each content among the one or more contents at respective playback times of the video P. That is, when the compilation server 105 receives a report specifying the web page A from a viewing terminal 104, the compilation server 105 compiles a trend in the numbers of viewers who are browsing the web page A (210). In this processing, "compiling a trend in the numbers of viewers at respective playback times" may, for example, be processing of compiling the number of viewers at each predetermined unit of time.

Subsequently, the compilation server 105 transmits the trend in the numbers of viewers who are browsing the web page A to the distribution terminal 102 (211).

Next, in each terminal of the viewing terminals 104x to 104z, a specific status in a content can be updated in response to an operation performed by a viewer who uses the viewing terminal 104 while the video P is being played. When the viewer, operating the viewing terminal 104, requests, for example, an action a, which is an action to add a product or the like to an electronic cart in the web page A, the viewing terminal 104 sends a request specifying the action a to the provisioning server 106 (212).

When the provisioning server 106 receives the request specifying the action a from the viewing terminal 104, the provisioning server 106 sends a response specifying a change in a status, that is, addition of a product or the like, to the viewing terminal 104 (213).

When the viewing terminal 104 receives the response specifying addition of a product or the like, the viewing terminal 104, by adding the product or the like to the electronic cart in the web page A, changes a status (214).

The compilation server 105 collects that a/the specific status in a content that is being browsed has been updated while the video P is being played in the viewing terminal 104. That is, the viewing terminal 104 searches the action list L, and, since the update of a specific status is included in the action list L, the viewing terminal 104 sends a report specifying that a specific status has been updated, that is, a product or the like has been added to the electronic cart, to the compilation server 105 (215).

The compilation server 105 compiles a trend in the numbers of viewers, among the plurality of viewers, who caused a specific status to be updated at respective playback times of the video P, or who have caused the specific status to be updated at certain playback times of the video P. That is, when the compilation server 105 receives the report specifying that a product or the like has been added to the electronic cart from the viewing terminal 104, the compilation server 105 compiles a trend in the numbers of viewers who caused a product or the like to be added to an electronic cart (216).

Subsequently, the compilation server 105 transmits the trend in the numbers of viewers who caused, or who have caused, a product or the like to be added to an electronic cart to the distribution terminal 102 (217).

Next, when the viewer, operating the viewing terminals 104, performs an operation to purchase a product or the like in the electronic market and completes settlement, the viewing terminal 104 sends a request specifying a web page B, which is a settlement completion page including a product or the like presented in the video P, to the provisioning server 106 (218). When the provisioning server 106 receives the request specifying the web page B from the viewing terminal 104, the provisioning server 106 identifies the web page B and sends a response specifying the web page B to the viewing terminal 104 (219). A flow of exchange of data related to the web page B from the next step onward is the same as the flow of steps (208) to (211) related to the web page A (220 to 223).

(Terminal Processing and Server Processing)

Figure 4:
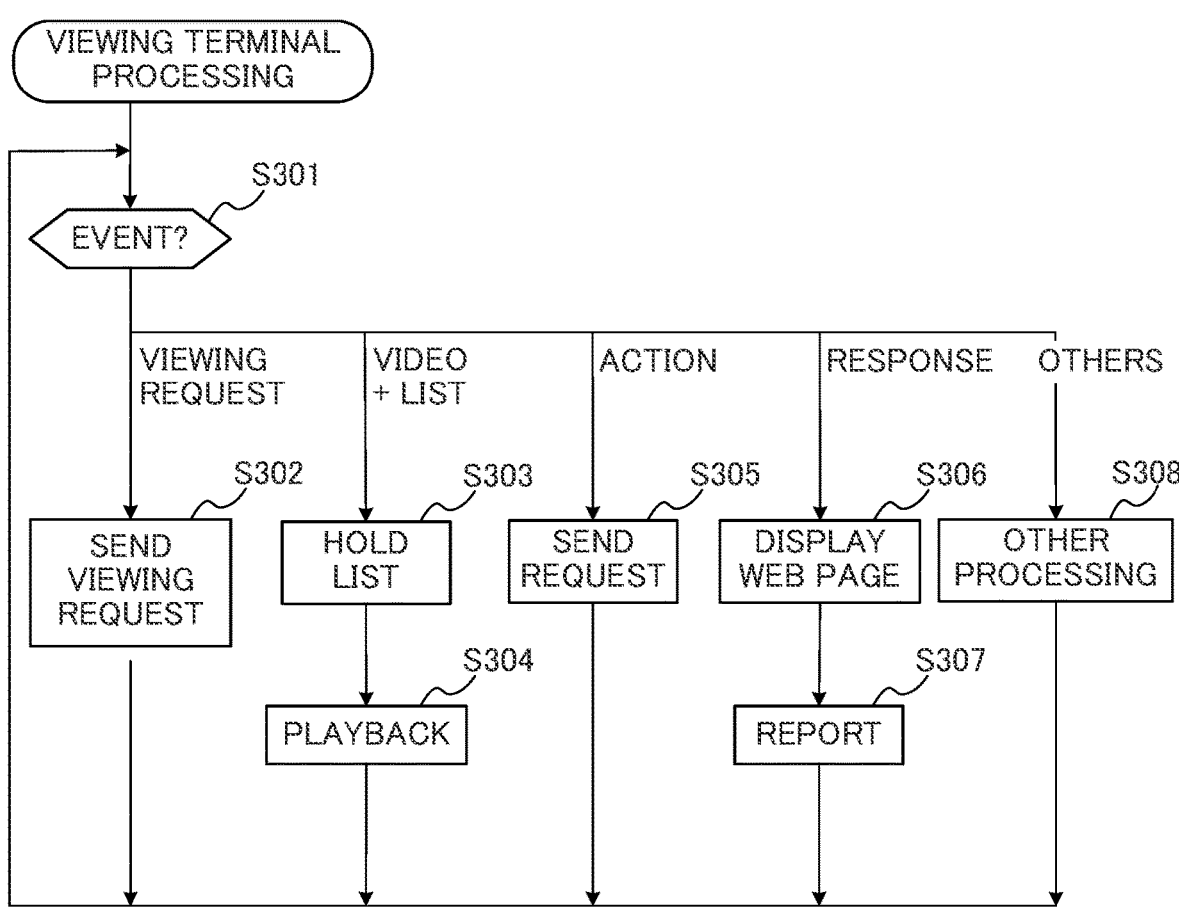
FIG. 4 is a flowchart illustrating a flow of viewing terminal processing in Embodiment 1.

FIG. 4 is a flowchart describing a flow of viewing terminal processing executed in each of the viewing terminals 104 in Embodiment 1. Hereinafter, the description is made with reference to FIG. 4.

Each of the viewing terminals 104 starts the viewing terminal processing when, for example, an app is started. When the viewing terminal processing is started, the viewing terminal 104 is put into a standby state until one of the following events occurs (step S301).

When a viewer, operating the viewing terminal 104, performs an operation to view a video P, such as selecting a thumbnail image of the video P, the viewing terminal 104, specifying the video P and the account of the viewer, sends a viewing request to the compilation server 105 (step S302). Subsequently, the process returns to step S301.

Next, when the viewing terminal 104 receives distribution of the video P and receives the action list L thereof from the distribution server 103, the viewing terminal 104 holds the action list L (step S303) and starts playing the video P (step S304). On this occasion, the viewing terminal 104 may be configured to identify information required for performing streaming playback of the video. That is, the viewing terminal 104, after storing a portion of the video in a buffer memory, plays the video. When the video data stored in the buffer memory become scarce, the viewing terminal 104 acquires succeeding video data from the distribution server 103 and, while playing the video, stores a remaining portion of the video that has not been played in the buffer memory. Subsequently, the process returns to step S301.

When the viewer, operating the viewing terminal 104, performs an action to browse the web page A or B, the viewing terminal 104 sends a request specifying the web page A or B to the provisioning server 106 (step S305). Alternatively, when the viewer performs the action a to change a status, the viewing terminal 104 sends a request specifying the action a to the provisioning server 106. Subsequently, the process returns to step S301.

Next, when the viewing terminal 104 receives a response specifying the web page A or B from the provisioning server 106, the viewing terminal 104 displays the web page A or B (step S306). Alternatively, when the viewing terminal 104 receives a response specifying an update of a status from the provisioning server 106, the viewing terminal 104 updates a status in the displayed web page.

Figure 5:
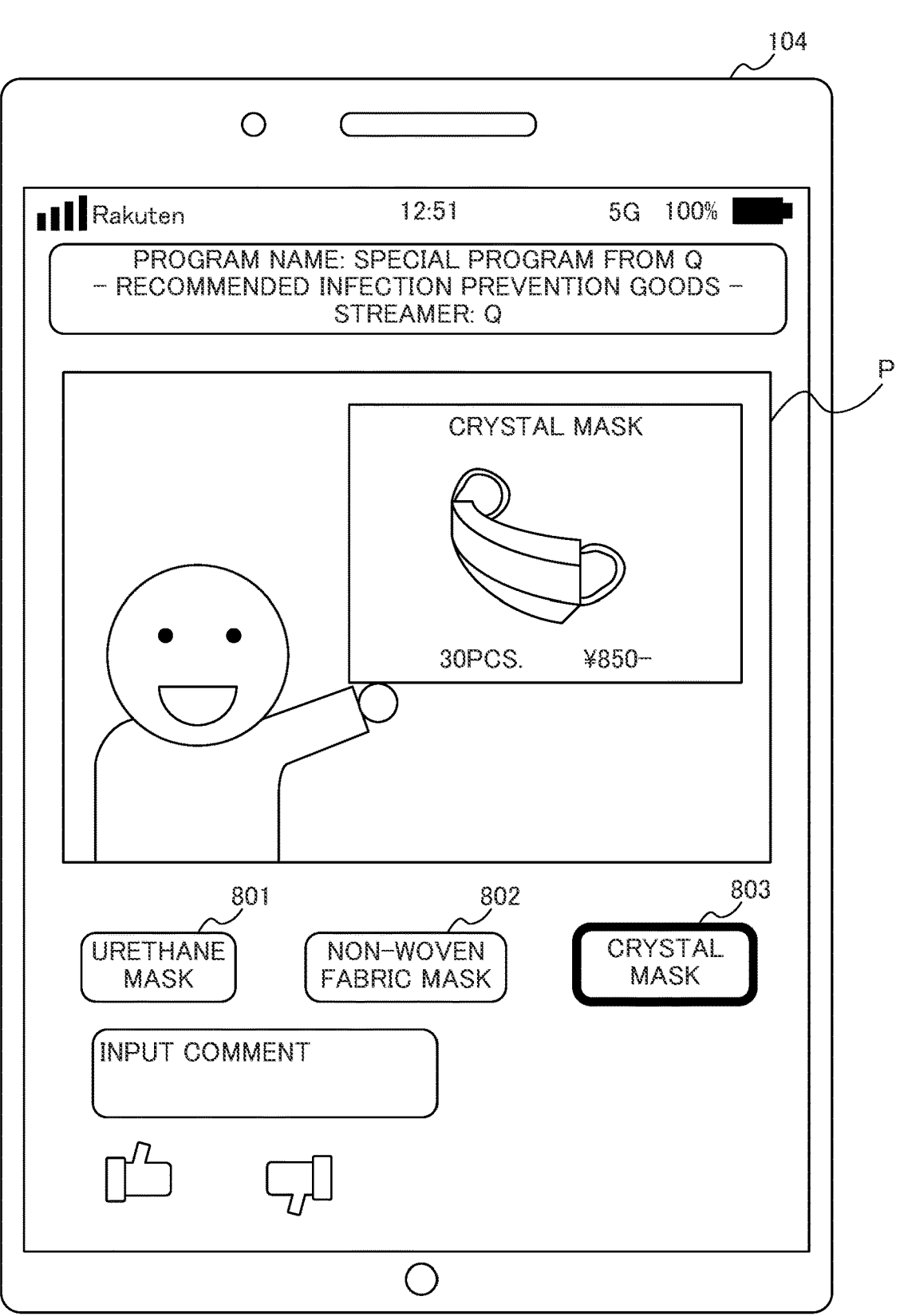
FIG. 5 is an explanatory diagram illustrating an example of a screen of a viewing terminal.

FIG. 5 is a screen example illustrating a manner in which a video P is played by a viewing terminal 104. In the example in FIG. 5, a streamer has been presenting products "urethane mask", "non-woven fabric mask", and "crystal mask" in sequence, and the product "crystal mask" is currently presented. On the screen of the viewing terminal 104, the video P is played in a large area, and, under the video P, purchase buttons 801, 802, and 803 of the products "urethane mask", "non-woven fabric mask", and "crystal mask" are displayed. When one of the purchase buttons 801 to 803 is selected, a product presentation page of a product corresponding to the selected button, that is, a web page A, is displayed. On this occasion, the viewing terminal 104 sends a request specifying the web page A to the provisioning server 106 and, after receiving a response specifying the web page A from the provisioning server 106, displays the web page A. Returning to FIG. 4, the process subsequently returns to step S301.

Figure 6:
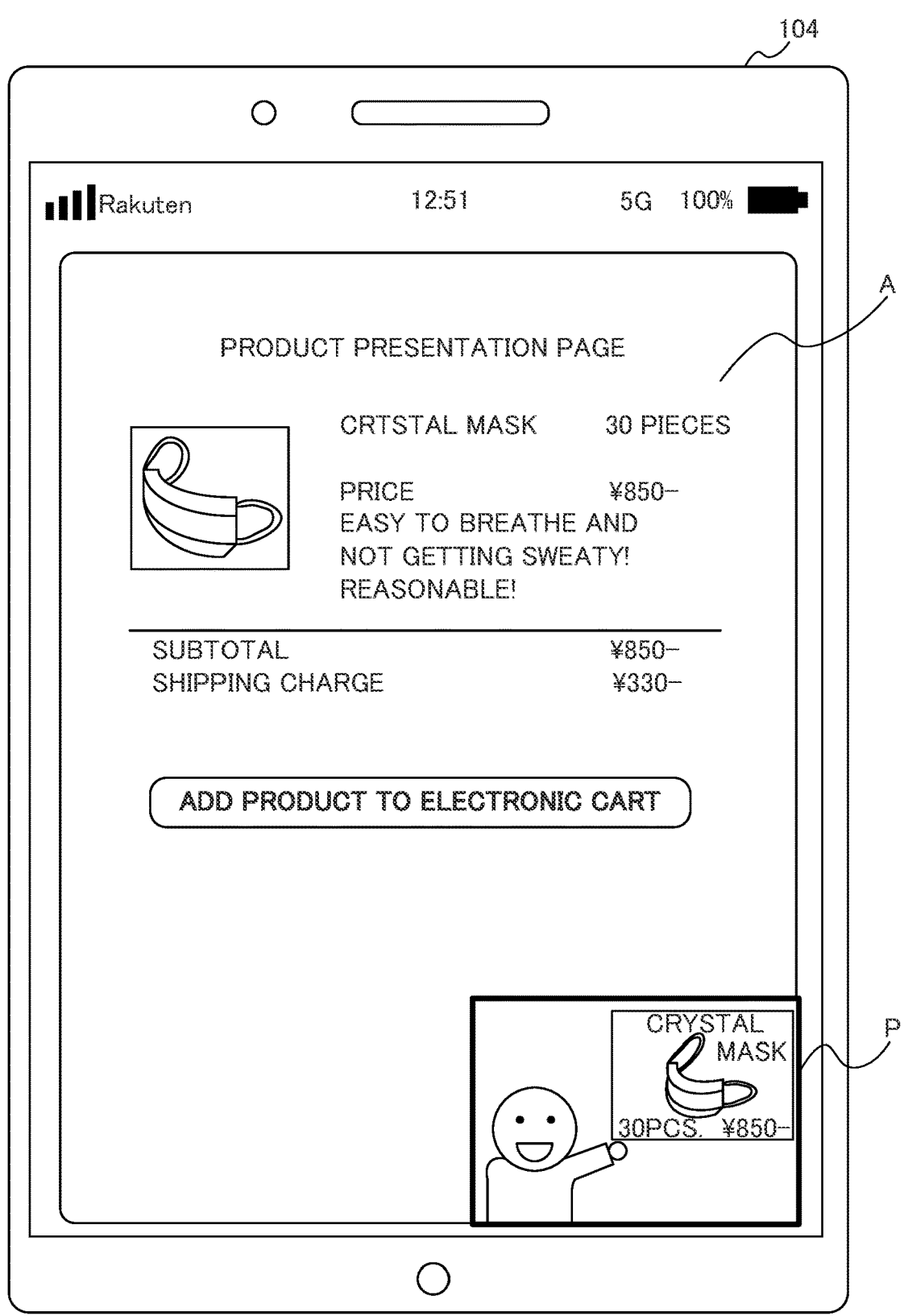
FIG. 6 is an explanatory diagram illustrating another example of the screen of the viewing terminal.

In addition, when, for example, the viewer selects the purchase button 803 of the product "crystal mask" in the screen example illustrated in FIG. 5, the viewing terminal 104 may be configured to perform display or the like of the web page A while playing the video P in a small size in the form of picture-in-picture, as in a screen example illustrated in FIG. 6.

Returning to FIG. 4, when the viewing terminal 104 displays the web page A or B or updates a status in the web page, the viewing terminal 104 determines whether or not the web page A or B or the update of a status is included in the action list L illustrated in FIG. 3. Since the web pages A and B and an update of a status are included in the action list L, the viewing terminal 104 sends a report specifying the web page A or B or that a status has been updated to the compilation server 105 (step S307). Subsequently, the process returns to step S301.

When an event other than the above-described events occurs, the viewing terminal 104 performs other processing corresponding to the event having occurred (step S308). Subsequently, the process returns to step S301.

Figure 7:
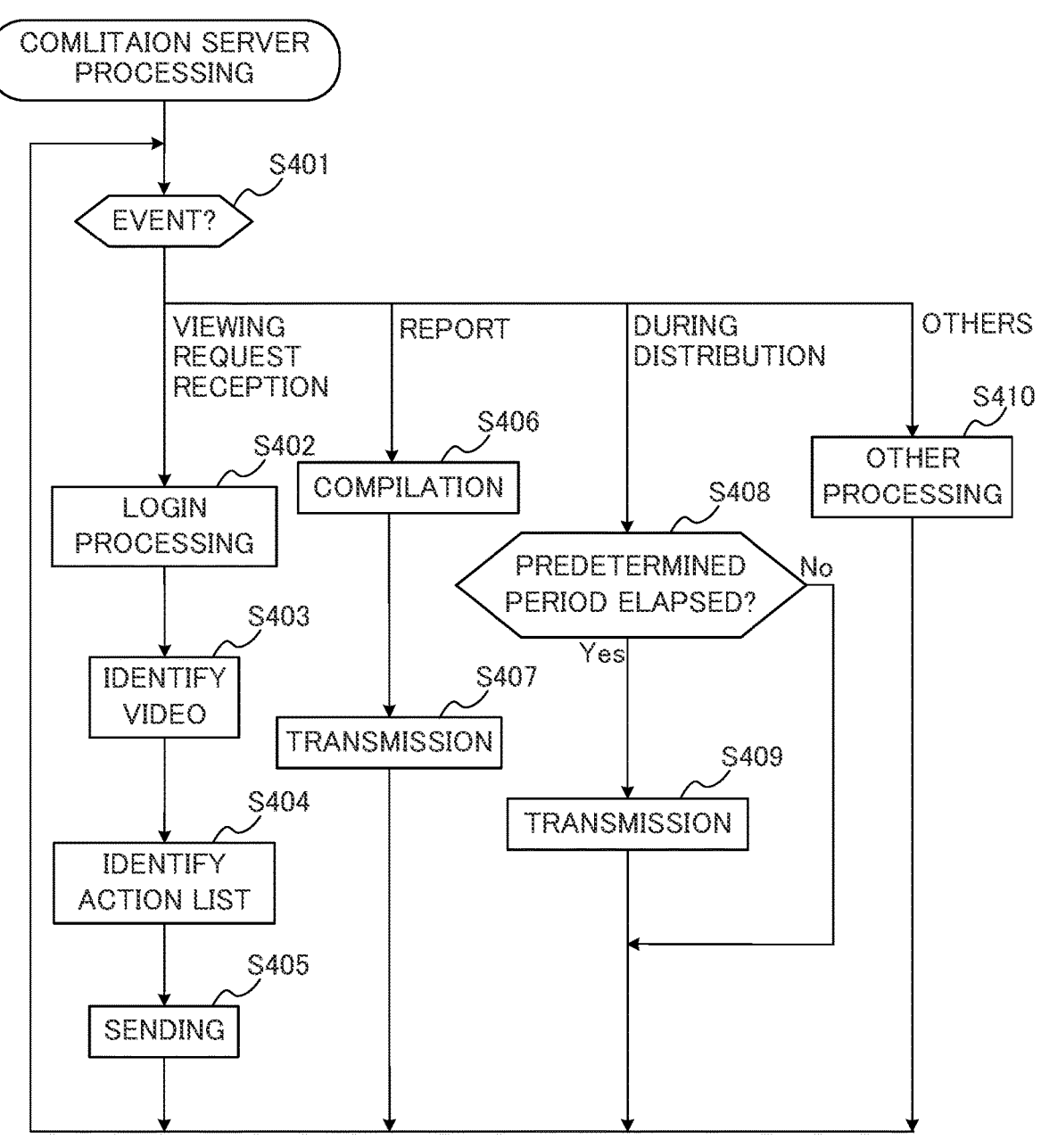
FIG. 7 is a flowchart illustrating a flow of compilation server processing in Embodiment 1.

FIG. 7 is a flowchart describing a flow of compilation server processing executed in the compilation server 105 in Embodiment 1. Hereinafter, the description is made with reference to FIG. 7.

The compilation server 105 starts the compilation server processing when, for example, the compilation server 105 is powered on. When the compilation server processing is started, the compilation server 105 is put into a standby state until one of the following events occurs (step S401).

When the compilation server 105 receives a viewing request specifying a video P and the account of a viewer from a viewing terminal 104, the compilation server 105 first performs login processing for the specified account (step S402). The compilation server 105 refers to registered user information, and, when the specified account is registered in the user information, the compilation server 105 causes the viewer to successfully log in.

After the login processing, the compilation server 105 identifies the video P specified in the request, which was received from the viewing terminal 104, in collaboration with the distribution server 103 (step S403). The compilation server 105 identifies the action list L of the video P in collaboration with the distribution server 103 (step S404).

When the compilation server 105 has identified the action list L, the compilation server 105 causes the distribution server 103 to distribute the video P and send the action list L to the viewing terminal 104 (step S405). Subsequently, the process returns to step S401.

When the compilation server 105 receives a report specifying the web page A or B or that a status has been updated from the viewing terminal 104, the compilation server 105 compiles a trend in the numbers of viewers who is browsing the web page or a trend in the number of viewers who have updated a status (step S406).

The compilation server 105 receives reports as illustrated in an example in FIG. 8 from the plurality of viewing terminals 104x to 104z. With each of reports illustrated in FIG. 8, a playback time at which an action was taken, an account that took the action, and the action that a viewer took are associated. The compilation server 105 receives reports specifying the web page A or B or that a status has been updated from the viewing terminal 104x that a viewer having the account x uses, the viewing terminal 104y that a viewer having the account y uses, and the viewing terminal 104z that a viewer having the account z uses.

In the example illustrated in FIG. 8, a playback time of the video P at which a viewer took each action may be specified by including the playback time in a report in which a viewing terminal 104 specifies the web page A or B or that the viewing terminal 104 has caused a status to be changed. Alternatively, the compilation server 105 may be configured to compile a trend in the numbers of viewers, based on a time at which the compilation server 105 received each report from a viewing terminal 104, that is, considering a time at which the compilation server 105 received the report as a playback time of the video P at which a viewer took each action.

Returning to FIG. 7, the compilation server 105 subsequently transmits the compiled trend in the numbers of viewers to the distribution terminal 102 (step S407). The compilation server 105 may be configured to transmit a trend in the numbers of viewers to the distribution terminal 102 every time the compilation server 105 compiles a trend or may be configured to transmit a trend in the numbers of viewers to the distribution terminal 102 when a predetermined period has elapsed, as performed in processing in step S408, to be described later.

Figure 9:
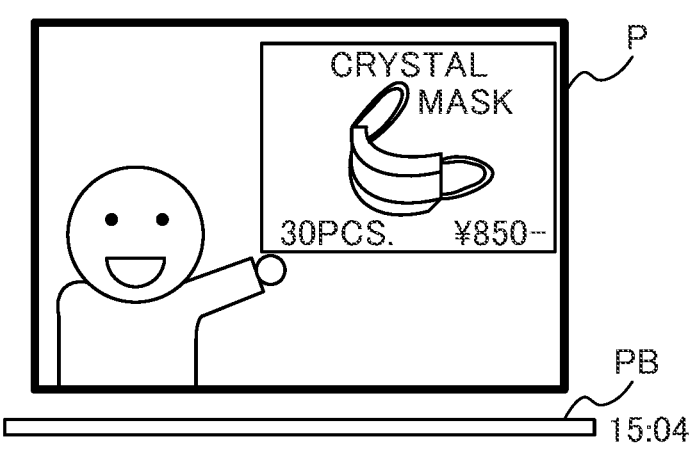
FIG. 9 is an explanatory diagram illustrating an example of a screen of a distribution terminal during distribution of a video.
Figure 9:
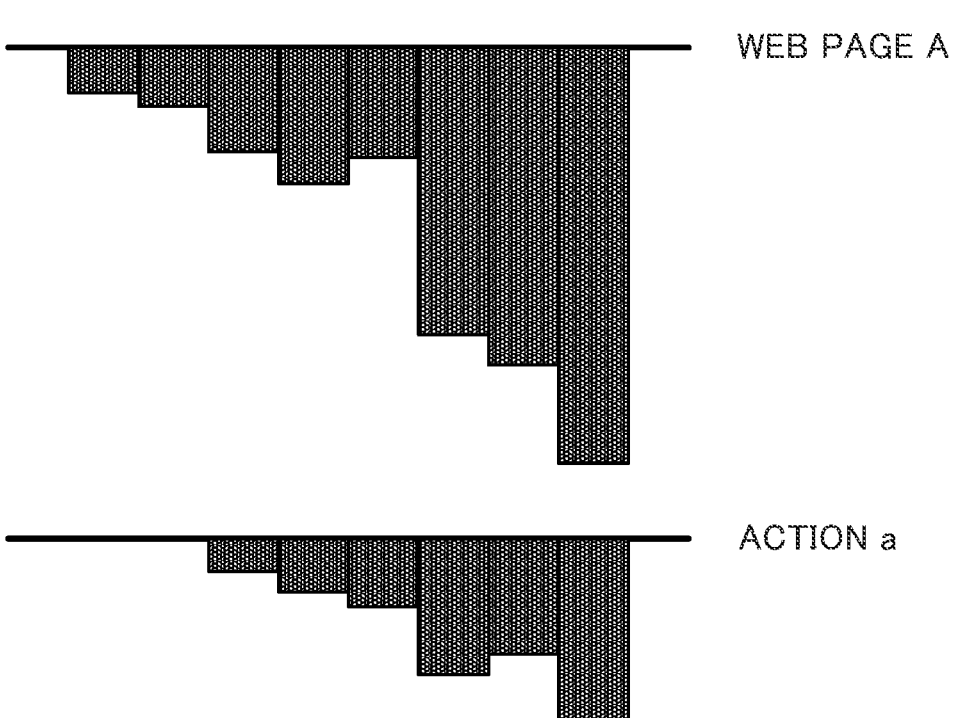

On the distribution terminal 102, which is a transmission destination, a compiled trend in the numbers of viewers is displayed as illustrated in a screen example in FIG. 9. In FIG. 9, the video P is displayed in conjunction with a playback time bar PB, which indicates a current playback time. Under the video P and the playback time bar PB, statistics of the numbers of viewers who have browsed the web page A, which is a product presentation page, the numbers of viewers who have taken the action a, which is addition of the product or the like to an electronic cart, and the numbers of viewers who have browsed the web page B, which is a settlement completion page, up to the current playback time are displayed. The statistics are represented by, for example, histograms, as illustrated in FIG. 9. The abscissas of the respective histograms represent time axes, and the histograms indicate the numbers of viewers who took the respective actions at each predetermined unit of time.

Figure 10:
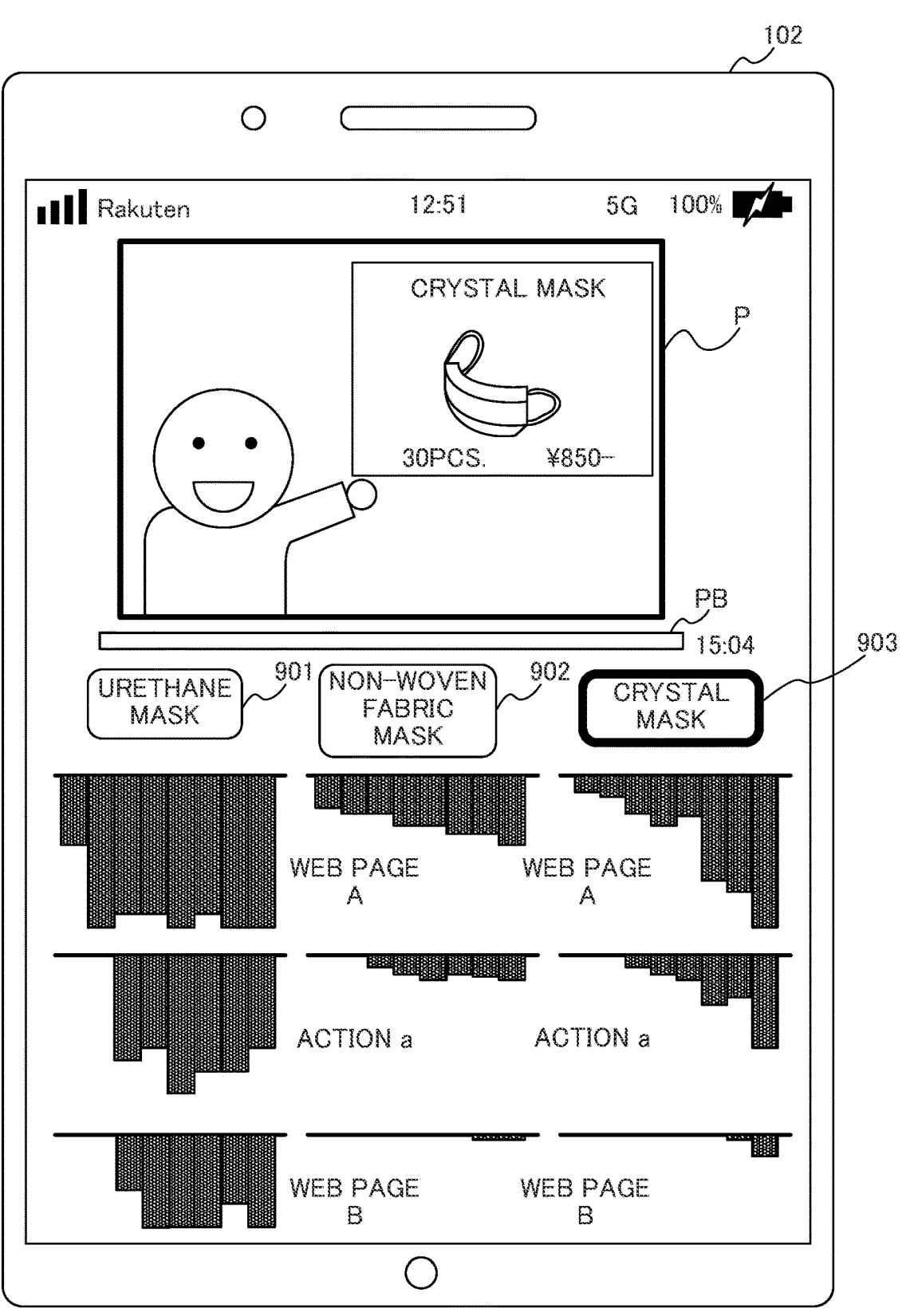
FIG. 10 is an explanatory diagram illustrating another example of the screen of the distribution terminal during distribution of the video.

When the streamer has a plurality of products or the like to be presented in the video P, each of the viewing terminals 104 may display the screen as illustrated in a screen example in FIG. 10. In the example illustrated in FIG. 10, the video P, in which the streamer himself/herself who is currently distributing the video P appears, is being played, and, below the video P, product buttons 901, 902, and 903 of products or the like that the streamer has been presenting in the video P are displayed. In addition, under each of the product buttons, statistics of the numbers of viewers who have browsed the web page A, the numbers of viewers who have taken the action a, and the numbers of viewers who have browsed the web page B with respect to the product or the like are displayed. In the histograms illustrated in FIG. 10, the abscissas also represent time axes, and the histograms indicate the numbers of viewers who took the respective actions at each predetermined unit of time.

Note that it may be configured such that, when the streamer selects a product button of a product or the like that the streamer is to present at the moment, a purchase button on the screen of a viewing terminal 104, illustrated in the example in FIG. 5, that corresponds to the selected product button is highlighted. For example, when the streamer selects the product button 903 relating to the product "crystal mask" on the distribution terminal 102, the purchase button 803 relating to the product "crystal mask" is highlighted, as illustrated in the example in FIG. 5, on a viewing terminal 104.

Since the streamer is able to know detailed responses from viewers while distributing the video P, the streamer can make use of such responses for improvement in a manner in which a product or the like is appealed in the future. In addition, when the streamer finds that responses to a product or the like from viewers are good during distribution of the video P, the streamer can extend a presentation time frame of the product or the like. On the contrary, when the streamer finds that responses to a product or the like from viewers are not good, the streamer can cut short presentation of the product or the like and turn to presentation of another product or the like, which enables sales promotion to be performed efficiently.

Figure 11:
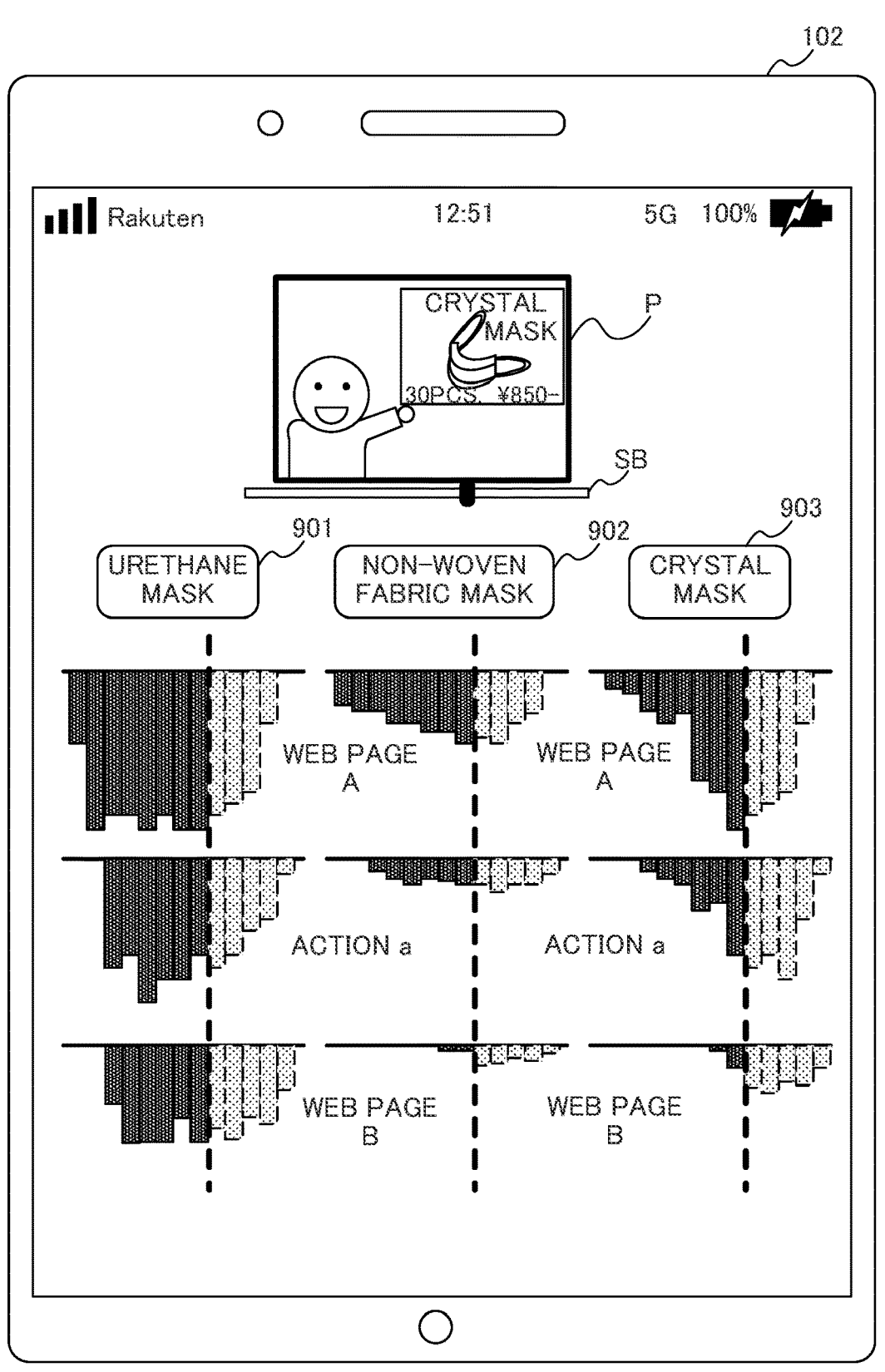
FIG. 11 is an explanatory diagram illustrating an example of a screen of the distribution terminal after live streaming.

In addition, when the streamer checks the video P after live streaming, the screen of the distribution terminal 102 is formed as a screen example illustrated in an example in FIG. 11. In the check screen after live streaming, a seek bar SB is displayed under the streamed video P in such a way as to enable the streamer to confirm a playback position. In addition, below the video P, the product buttons 901, 902, and 903 relating to the products "urethane mask", "nonwoven fabric mask", and "crystal mask", which were presented in the video P, are displayed. In addition, under each of the product buttons, statistics of the numbers of viewers who browsed the web page A, the numbers of viewers who took the action a, and the numbers of viewers who browsed the web page B with respect to the product or the like are displayed. In the histograms illustrated in FIG. 11, the abscissas also represent time axes, and the histograms indicate the numbers of viewers who took the respective actions at each predetermined unit of time.

A thick dotted line drawn in each of the histograms corresponds to a position of a playback time indicated by the seek bar SB. A portion of each histogram on the left side of the thick dotted line, which is indicated by a dark color, indicates statistics of actions of viewers up to the current playback time. In contrast, a portion of each histogram on the right side of the thick dotted line, which is indicated by a light color, indicates statistics of actions of viewers after the current playback time. A viewer is able to confirm a trend in the numbers of viewers after live streaming by referring to this screen and study and make use of the trend for sales promotion in the future. Returning to FIG. 7, the process subsequently returns to step S401.

The compilation server 105 may be configured to transmit a compilation result to the distribution terminal 102 every time a predetermined period has elapsed during distribution of the video P. That is, when a predetermined period has elapsed (Yes in step S408), the compilation server 105 transmits a compiled trend in the numbers of viewers to the distribution terminal 102 (step S409). Subsequently, the process returns to step S401.

In contrast, when the predetermined period has not elapsed (No in step S409), the process directly returns to step S401.

When an event other than the above-described events occurs, the compilation server 105 performs other processing corresponding to the event having occurred (step S410). Subsequently, the process returns to step S401.

As described above, according to Embodiment 1, the compilation server 105 compiles a trend in the numbers of viewers who took a specific action during viewing of a video P and transmits a compilation result to the distribution terminal 102. Because of this configuration, the streamer of the video P is able to know detailed responses from viewers while distributing the video P and make use of such responses for sales promotion by the streamer himself/herself.

In addition, according to Embodiment 1, since a viewer performs viewing of a video P and browsing of a content using the same app, the compilation server 105 compiles a trend of actions that viewers took during playback of the video P, based on reports from viewing terminals 104. Since this configuration enables browsing or the like of a content and report to the compilation server 105 to be performed by the same terminal, it is possible to design the system in such a way that the system has a simple structure.

Embodiment 2

Next, Embodiment 2 of the present disclosure is described. Although, in Embodiment 1, it was assumed that a viewer performed playback of a video P and browsing or the like of a content using the same app, it is assumed that playback of a video P and browsing or the like of a content are performed using different apps, in Embodiment 2. For example, a case is assumed where a viewer performs viewing of a video P using a video playback app and performs browsing or the like of a content using a general browser. Hereinafter, the same reference signs are assigned to the same constituent components as those in Embodiment 1.

(Transmission and Reception of Data between Terminal and Server)

Figure 12:
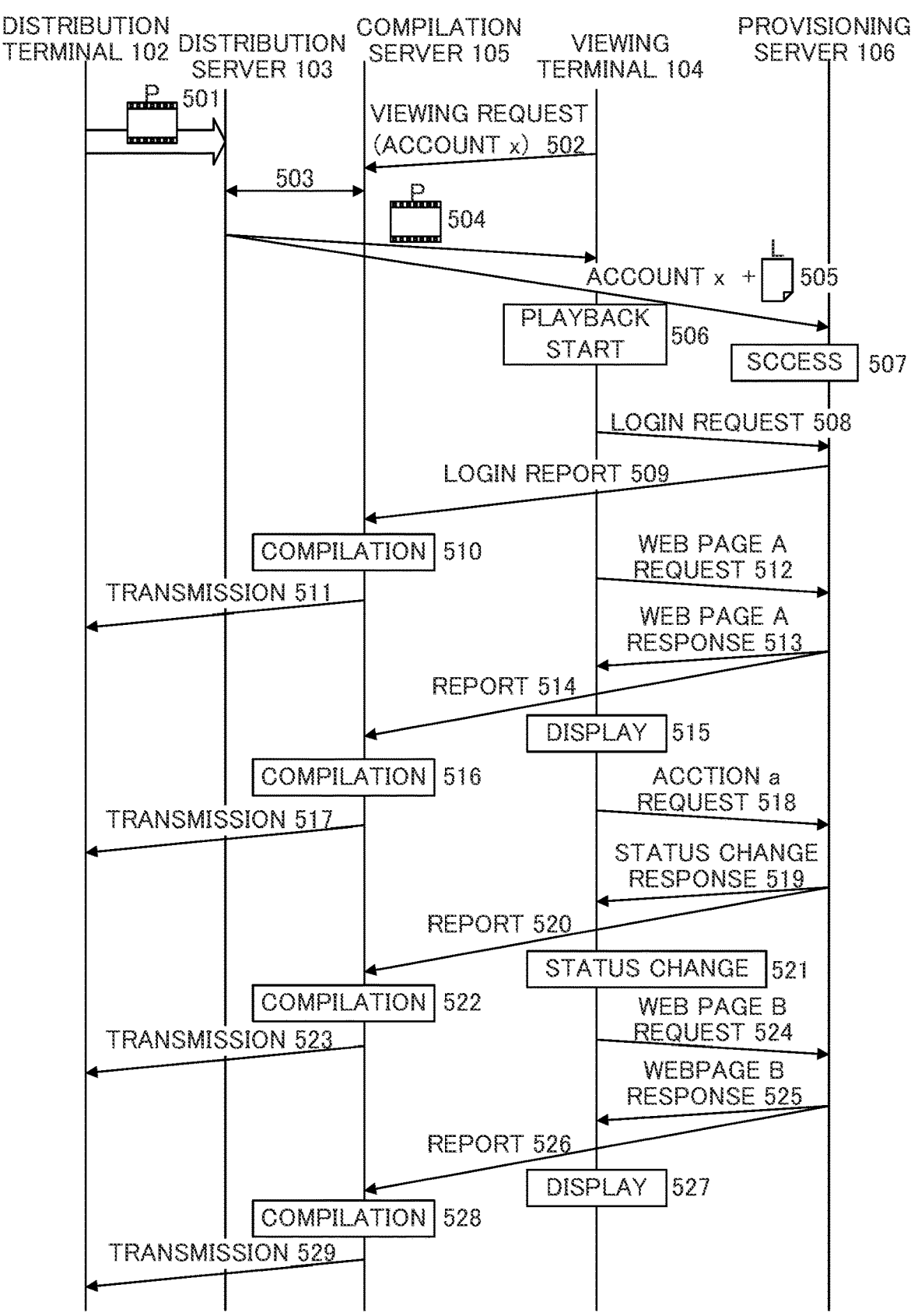
FIG. 12 is a session diagram illustrating a manner in which data are exchanged between terminals and servers in Embodiment 2.

FIG. 12 is a session diagram illustrating a manner in which data are exchanged in a compilation system 101 of Embodiment 2.

First, a distribution terminal 102 distributes a video P to a distribution server 103 in response to an operation performed by a streamer (501). One of viewing terminals 104 sends a viewing request to view the video P to a compilation server 105 in response to an operation by a viewer (502). In the viewing request, an account x of the viewer is specified.

When the compilation server 105 receives the viewing request, the compilation server 105 identifies the video P and an action list L thereof to be distributed to the viewing terminal 104 in collaboration with the distribution server 103 (503).

Subsequently, the distribution server 103 distributes the specified video P to the viewing terminal 104 (504) and sends the action list L in conjunction with information relating to the account x of the viewer to a provisioning server 106 (505).

When the viewing terminal 104 receives distribution of the video P from the distribution server 103, the viewing terminal 104 starts playing the video P (205).

Meanwhile, when the provisioning server 106 receives the action list L from the distribution server 103, the provisioning server 106 holds the action list L and attempts to perform login processing, based on information relating to the account x of the viewer, which was received in conjunction with the action list L. Herein, it is assumed that the login processing succeeds (507).

Next, when the viewer opens a browser in the viewing terminal 104 and performs an operation to log in to an electronic market that the provisioning server 106 provides, the viewing terminal 104 sends a login request specifying the account of the viewer to the provisioning server 106 (508). The provisioning server 106 causes the viewer to successfully log in and sends a login report specifying that the login has succeeded to the compilation server 105 (509).

When the compilation server 105 receives the login report, the compilation server 105 compiles a trend in the numbers of viewers who logged in to the electronic market using a browser (510). Subsequently, the compilation server 105 transmits the trend in the numbers of viewers who logged in to the electronic market to the distribution terminal 102 (511).

Next, when the viewer, operating the viewing terminal 104, requests display of a web page A, the viewing terminal 104 sends a request specifying the web page A to the provisioning server 106 (512).

When the provisioning server 106 receives the request specifying the web page A from the viewing terminal 104, the provisioning server 106 identifies the web page A and sends a response specifying the web page A to the viewing terminal 104 (513). The provisioning server 106 searches the action list L illustrated in FIG. 3, and, since the web page A is a content included in the action list L, the provisioning server 106 sends a report specifying the web page A to the compilation server 105 (514).

When the viewing terminal 104 receives the response specifying the web page A, the viewing terminal 104 displays the web page A (515). Meanwhile, when the compilation server 105 receives the report specifying the web page A from the provisioning server 106, the compilation server 105 compiles a trend in the numbers of viewers who are browsing the web page A (516). Subsequently, the compilation server 105 transmits the trend in the numbers of viewers who are browsing the web page A to the distribution terminal 102 (517).

Next, when the viewer, operating the viewing terminal 104, requests an action a, the viewing terminal 104 sends a request specifying the action a to the provisioning server 106 (518).

When the provisioning server 106 receives the request specifying the action a from the viewing terminal 104, the provisioning server 106 sends a response specifying a change in a status to the viewing terminal 104 (519). The provisioning server 106 searches the action list L illustrated in FIG. 3, and, since a change in a status is included in the action list L, the provisioning server 106 sends a report specifying that the provisioning server 106 has changed a status to the compilation server 105 (520).

When the viewing terminal 104 receives the response specifying a change in a status, the viewing terminal 104 changes a status in a web page that is being displayed (521). Meanwhile, when the compilation server 105 receives the report specifying that the provisioning server 106 has changed a status from the provisioning server 106, the compilation server 105 compiles a trend in the numbers of viewers who caused a status to be changed (522). Subsequently, the compilation server 105 transmits the trend in the numbers of viewers who caused a status to be changed to the distribution terminal 102 (523).

Next, when the viewer, operating the viewing terminal 104, performs an operation to purchase a product or the like in the electronic market and completes settlement, the viewing terminal 104 sends a request specifying a web page B, which is a settlement completion page including a product or the like presented in the video P, to the provisioning server 106 (524). When the provisioning server 106 receives the request specifying the web page B from the viewing terminal 104, the provisioning server 106 identifies the web page B and sends a response specifying the web page B to the viewing terminal 104 (525). A flow of exchange of data related to the web page B from the next step onward is the same as the flow of steps (512) to (517) related to the web page (524 to 529).

(Terminal Processing and Server Processing)

Figure 13:
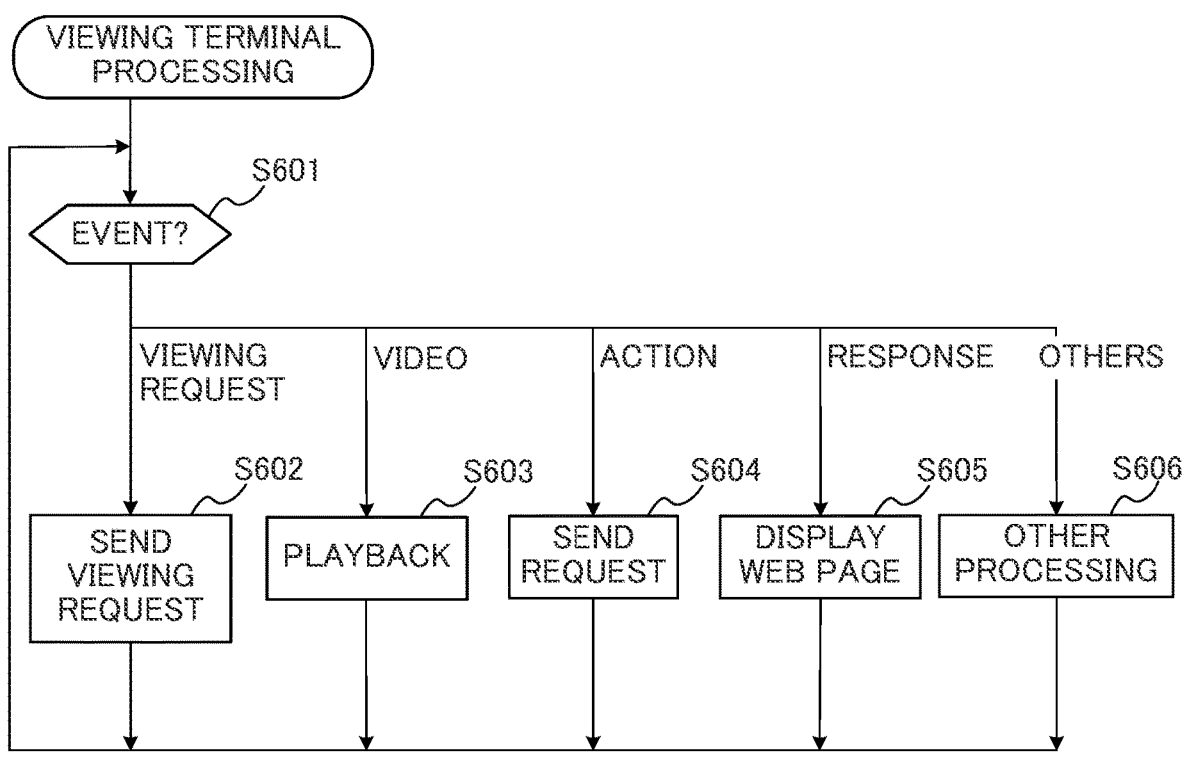
FIG. 13 is a flowchart illustrating a flow of viewing terminal processing in Embodiment 2.

FIG. 13 is a flowchart describing a flow of viewing terminal processing executed in each of the viewing terminals 104 in Embodiment 2. Hereinafter, the description is made with reference to FIG. 13.

Each of the viewing terminals 104 starts the viewing terminal processing when, for example, an app is started. When the viewing terminal processing is started, the viewing terminal 104 is put into a standby state until one of the following events occurs (step S601).

When a viewer, operating the viewing terminal 104, performs an operation to send a viewing request of a video P, such as selecting a thumbnail image of the video P, the viewing terminal 104 specifies the video P and the account of the viewer and sends the viewing request to the compilation server 105 (step S602). Subsequently, the process returns to step S301.

Next, when the viewing terminals 104 receives distribution of the video P from the distribution server 103, the viewing terminal 104 starts playing the video P (step S603). Subsequently, the process returns to step S601.

When the viewer, operating the viewing terminal 104, performs an action to perform browsing or the like of a web page, the viewing terminal 104 sends a request specifying the web page and the like to the provisioning server 106 (step S604). Subsequently, the process returns to step S601.

When the viewing terminal 104 receives a response specifying a web page and the like from the provisioning server 106, the viewing terminal 104 performs display or the like of the web page (step S605). In Embodiment 2, the screen is also displayed as illustrated in the screen examples in FIGS. 5 and 6. Subsequently, the process returns to step S601.

When an event other than the above-described events occurs, the viewing terminal 104 performs other processing corresponding to the event having occurred (step S606). Subsequently, the process returns to step S601.

Figure 14:
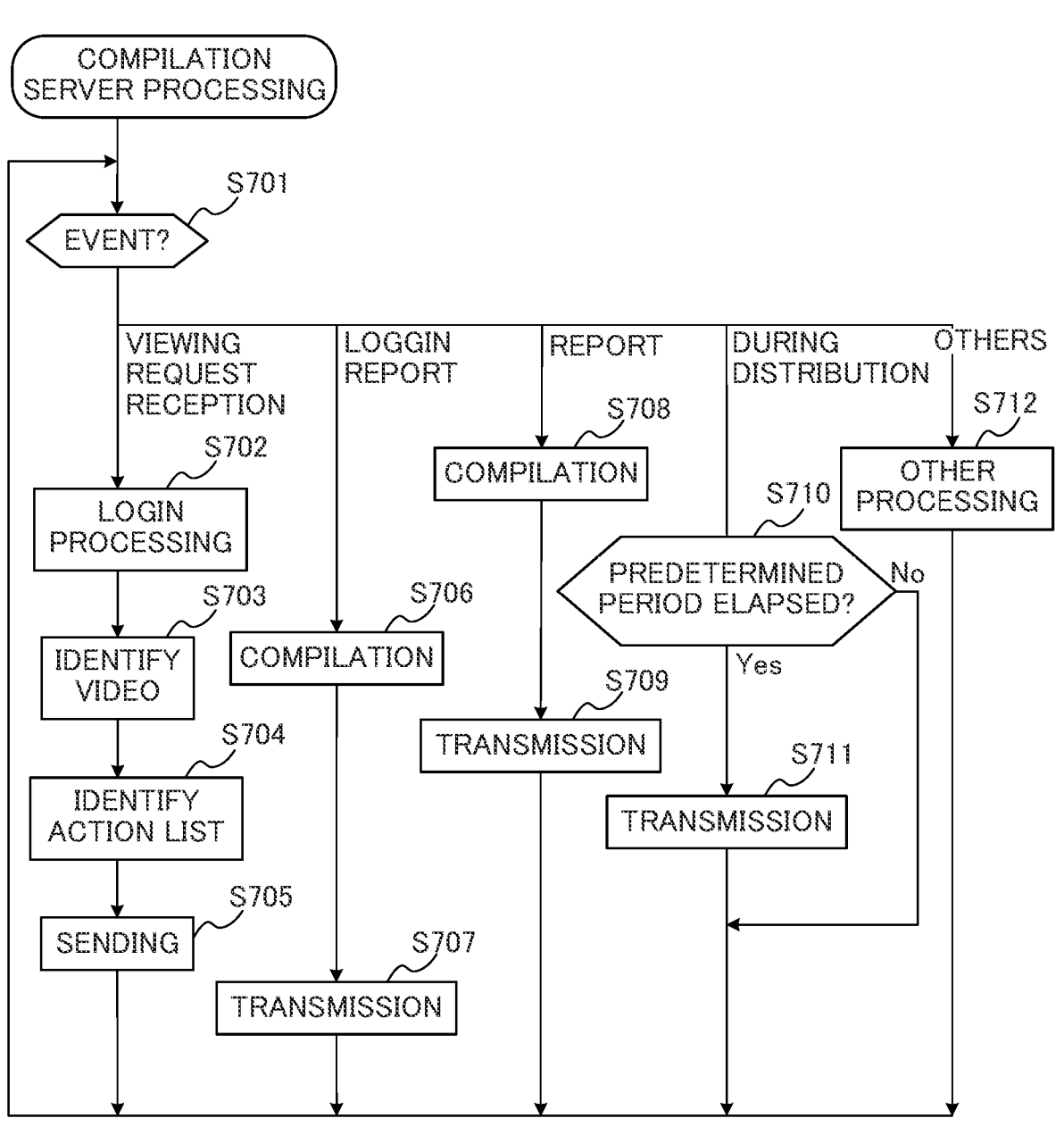
FIG. 14 is a flowchart illustrating a flow of compilation server processing in Embodiment 2.

FIG. 14 is a flowchart describing a flow of compilation server processing executed in the compilation server 105 in Embodiment 2. Hereinafter, the description is made with reference to FIG. 14.

The compilation server 105 starts the compilation server processing when, for example, the compilation server 105 is powered on. When the compilation server processing is started, the compilation server 105 is put into a standby state until one of the following events occurs (step S701).

When the compilation server 105 receives a viewing request specifying a video P and the account of a viewer from a viewing terminal 104, the compilation server 105 first performs login processing for the specified account (step S702).

After the login processing, the compilation server 105 identifies the video P specified in the request, which was received from the viewing terminal 104, in collaboration with the distribution server 103 (step S703). The compilation server 105 identifies an action list L of the video P in collaboration with the distribution server 103 (step S704).

Subsequently, the compilation server 105 causes the distribution server 103 to distribute the video P to the viewing terminal 104 and send the action list L in conjunction with information relating to the account of the viewer to the provisioning server 106 (step S705). Subsequently, the process returns to step S701.

When the compilation server 105 receives a login report from the provisioning server 106, the compilation server 105 compiles a trend in the numbers of viewers who logged in to the electronic market (step S706). The compilation server 105 may transmit a compilation result to the distribution terminal 102 every time the compilation server 105 compiles a trend (step S707). Subsequently, the process returns to step S701.

When the compilation server 105 receives a report specifying a web page and the like from the provisioning server 106, the compilation server 105 compiles a trend in the numbers of viewers who performed browsing or the like of the web page (step S708). The compilation server 105 may transmit a compilation result to the distribution terminal 102 every time the compilation server 105 compiles a trend (step S709). In Embodiment 2, the screen of the distribution terminal 102, which is a transmission destination, is also displayed as illustrated in the screen examples in FIGS. 9 to 11. Note that, although, in FIGS. 9 to 11, statistics of viewers who browsed the web page A or B and viewers who took the action a are illustrated, it may be configured such that statistics of viewers who logged in to the electronic market are displayed.

The compilation server 105 may be configured to transmit a compilation result to the distribution terminal 102 every time a predetermined period has elapsed during distribution of the video P. That is, when a predetermined period has elapsed (Yes in step S710), the compilation server 105 transmits a compiled trend in the numbers of viewers to the distribution terminal 102 (step S711). Subsequently, the process returns to step S701.

In contrast, when the predetermined period has not elapsed (No in step S710), the process directly returns to step S701.

When an event other than the above-described events occurs, the compilation server 105 performs other processing corresponding to the event having occurred (step S712). Subsequently, the process returns to step S701.

Figure 15:
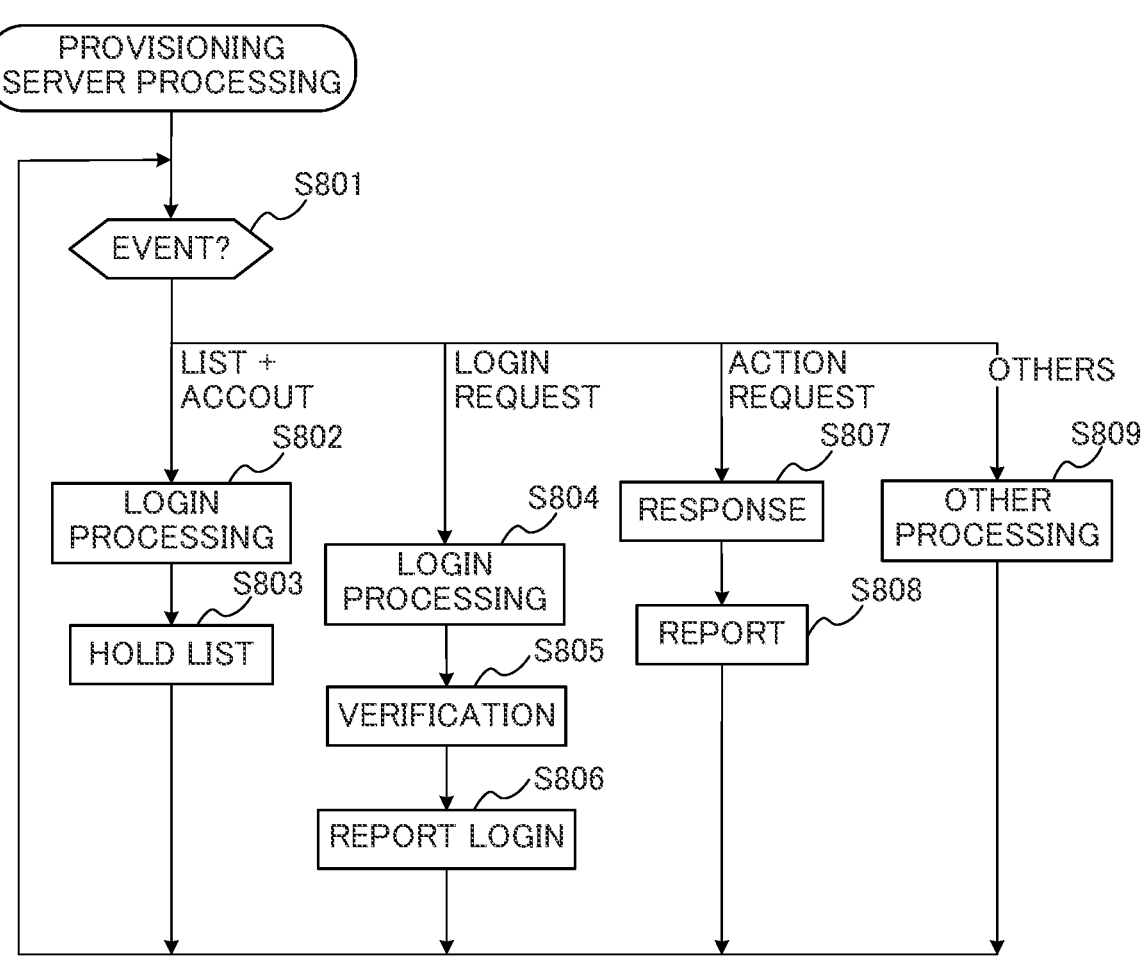
FIG. 15 is a flowchart illustrating a flow of provisioning server processing in Embodiment 2.

FIG. 15 is a flowchart describing a flow of provisioning server processing executed in the provisioning server 106 in Embodiment 2. Hereinafter, the description is made with reference to FIG. 15.

The provisioning server 106 starts the provisioning server processing when, for example, the provisioning server 106 is powered on. When the provisioning server processing is started, the provisioning server 106 is put into a standby state until one of the following events occurs (step S801).

When the provisioning server 106 receives an action list L in conjunction with information about an account of a viewer from the distribution server 103, the provisioning server 106 first refers to registered user information and performs login processing for the account (step S802). The provisioning server 106 holds the received action list L (step S803). Subsequently, the process returns to step S801.

Next, when the provisioning server 106 receives a login request requesting login to the electronic market from a viewing terminal 104, the provisioning server 106 performs login processing (step S804). When the login processing succeeds, the provisioning server 106 verifies whether or not a viewer related to the account having logged in to the electronic market has already been viewing the video P, that is, whether or not the account that the provisioning server 106 received in conjunction with the action list L has already logged in (step S805).

When the verification result indicates that a viewer related to the account having logged in to the electronic market has already been viewing the video P, the provisioning server 106 sends a login report to the compilation server 105 (step S806). Subsequently, the process returns to step S801.

Next, when the provisioning server 106 receives a request specifying the web page A or B or the action a from a viewing terminal 104, the provisioning server 106 sends a response matching the specified page or action to the viewing terminal 104 (S807). That is, when the web page A or B is specified in the received request, the provisioning server 106 identifies the respective specified web page and sends a response specifying the identified web page to the viewing terminal 104. In addition, when the action a is specified in the received request, the provisioning server 106 identifies an update of a status and sends a response specifying an update of a status to the viewing terminal 104.

The provisioning server 106 searches the action list L illustrated in FIG. 3, and, since the web page A or B or an update of a status is included in the action list L, the provisioning server 106 sends a report specifying the web page A or B or that a status has been updated to the compilation server 105 (step S808). Subsequently, the process returns to step S801.

When an event other than the above-described events occurs, the provisioning server 106 performs other processing corresponding to the event having occurred (step S809). Subsequently, the process returns to step S801.

As described above, in Embodiment 2, it is assumed that a viewer performs playback of a video P using an app and performs access to the electronic market using a general browser. Because of this configuration, it is possible to flexibly cope with even a case where a viewer performs playback of a video P and access to the electronic market using different apps.

Variations

Although, in the above-described embodiments, it was described that a video P was distributed from the distribution terminal 102 to a viewing terminal 104 by way of the distribution server 103, a distribution route of a video P is not limited thereto. For example, it may be configured such that a video P is directly distributed from the distribution terminal 102 to a viewing terminal 104.

In addition, although, in the above-described embodiments, it was described that the compilation server 105 transmitted a compilation result of a trend in the numbers of viewers to the distribution terminal 102, it may be configured such that the compilation server 105 does not transmit a compilation result to the distribution terminal 102.

In addition, although, in the above-described embodiments, it was described that the compilation server 105 and the distribution server 103 were assumed to be independent of each other, the compilation server 105 and the distribution server 103 may be integrated with each other.

Supplementary Note 1

A compilation system including a plurality of viewing terminals with which a plurality of viewers respectively views a video, and a compilation server, wherein each terminal of the plurality of viewing terminals, using
        at least one processor of one or more processors that the
        terminal includes, enables a viewer using the terminal to browse one of one or more contents associated with the video in advance while the video is being played in the terminal, and the compilation server, using at least one processor of one or more processors that the compilation server includes collects whether either one of the one or more contents is being browsed while the video is being played in each terminal of the plurality of viewing terminals, and compiles a trend in numbers of viewers, among the plurality of viewers, who have been browsing respective content of the one or more contents at certain playback times of the video.

Supplementary Note 2

The compilation system according to Supplementary Note 1, wherein the compilation system further includes a distribution terminal to distribute the video, the distribution terminal, using at least one processor of one or more processors that the distribution terminal includes, distributes the video to each terminal of the plurality of viewing terminals, and the compilation server transmits the compiled trend to the distribution terminal.

Supplementary Note 3

The compilation system according to Supplementary Note 1 or 2, wherein each terminal of the plurality of viewing terminals, when the terminal detects that one of one or more contents associated with the video in advance is being browsed while the video is being played, sends a report in which the detected content is specified to the compilation server, and the compilation server receives reports sent from the plurality of viewing terminals, and compiles a trend in numbers of viewers, among the plurality of viewers, who have been browsing respective content of the one or more contents at certain playback times of the video.

Supplementary Note 4

The compilation system according to Supplementary Note 1 or 2, wherein the compilation system further includes a provisioning server to provide the contents, the provisioning server, using at least one processor of one or more processors that the provisioning server includes:

provides the viewing terminal with the one or more contents in a browsable manner; and when the provisioning server detects that one of the one or more contents is being browsed while the video is being played, sends a report in which the detected content is specified to the compilation server, and the compilation server receives a report sent from the provisioning server, and compiles a trend in numbers of viewers, among the plurality of viewers, who have been browsing respective content of the one or more contents at certain playback times of the video.

Supplementary Note 5

The compilation system according to Supplementary Note 3 or 4, wherein the viewing terminal or the provisioning server further specifies a playback time of the video at which the content was detected in the report and sends the report to the compilation server.

Supplementary Note 6

The compilation system according to any one of Supplementary Notes 3 to 5, wherein the compilation server compiles a trend in numbers of viewers who have been browsing respective content of the one or more contents, based on a time at which the compilation server received the report.

Supplementary Note 7

The compilation system according to any one of Supplementary Notes 1 to 6, wherein each terminal of the plurality of viewing terminals is configured to allow a specific status in the content to be updated in response to an operation performed by a viewer who uses the terminal while the video is being played in the terminal, and the compilation server collects that the specific status in the content has been updated while the video is being played in each terminal of the plurality of viewing terminals, and compiles a trend in numbers of viewers, among the plurality of viewers, who have caused the specific status to be updated at certain playback times of the video.

Supplementary Note 8

The compilation system according to Supplementary Note 7, wherein the content is a web page in an electronic market, the specific status is whether or not a product or a service is added to an electronic cart in the electronic market, and the compilation server:

collects that a product or a service has been added to the electronic cart in the web page; and compiles a trend in numbers of viewers, among the plurality of viewers, who have caused the product or the service to be added to the electronic cart at certain playback times of the video.

Supplementary Note 9

A compilation server to be connected in a communicable manner to each terminal of a plurality of viewing terminals with which a plurality of viewers respectively views a video, including:

one or more processors, wherein the compilation server, using at least one processor of the one or more processors:

collects whether either one of one or more contents associated with the video in advance is being browsed while the video is being played in each terminal of the plurality of viewing terminals; and compiles a trend in numbers of viewers, among the plurality of viewers, who have been browsing respective content of the one or more contents at certain playback times of the video.

Supplementary Note 10

A compilation method, including, in a compilation system including a plurality of viewing terminals with which a plurality of viewers respectively views a video, and a compilation server, by each terminal of the plurality of viewing terminals, enabling a viewer using the terminal to view one of one or more contents associated with the video in advance while the video is being played in the terminal, and by the compilation server

19 collecting whether either one of the one or more contents is being browsed while the video is being played in each terminal of the plurality of viewing terminals, and compiling a trend in numbers of viewers, among the plurality of viewers, who have been browsing respective content of the one or more contents at certain playback times of the video.

The foregoing describes some example embodiments for explanatory purposes. Although the foregoing discussion has presented specific embodiments, persons skilled in the art will recognize that changes may be made in form and detail without departing from the broader spirit and scope of the invention. Accordingly, the specification and drawings are to be regarded in an illustrative rather than a restrictive sense. This detailed description, therefore, is not to be taken in a limiting sense, and the scope of the invention is defined only by the included claims, along with the full range of equivalents to which such claims are entitled.

INDUSTRIAL APPLICABILITY

The present disclosure can be suitably employed for live distribution that enables a trend of actions taken by viewers viewing the live distribution to be grasped.

REFERENCE SIGNS LIST

101 Compilation system
102 Distribution terminal
103 Distribution server
104, 104$x$, 104$y$, 104$z$ Viewing terminal
105 Compilation server
106 Provisioning server
801, 802, 803 Purchase button
901, 902, 903 Product button
L Action list
P Video
PB Playback time bar
SB Seek bar

The invention claimed is:

1. A compilation system comprising:
a plurality of viewing terminals with which a plurality of viewers respectively views a video;
a provisioning server; and
a compilation server, wherein
  each terminal of the plurality of viewing terminals, using at least one processor of one or more processors that the terminal includes, enables a viewer using the terminal to browse one of one or more contents associated with the video in advance while the video is being played in the terminal;
  the provisioning server, using at least one processor of one or more processors that the provisioning server includes:
    receives a request from at least one of the plurality of viewing terminals, wherein the request identifies at least a web page;
    transmits a response to the at least one of the plurality of viewing terminals; and
    transmits a report specifying the web page to the compilation server based on the web page being included in an action list associated with the video; and
  the compilation server, using at least one processor of one or more processors that the compilation server includes:

20 collects whether either one of the one or more contents is being browsed while the video is being played in each terminal of the plurality of viewing terminals, wherein the collecting includes receiving the report from the provisioning server; and compiles a trend in numbers of viewers, among the plurality of viewers, who have been browsing respective content of the one or more contents at certain playback times of the video; and wherein the compilation system further comprises a distribution terminal to distribute the video, the distribution terminal, using at least one processor of one or more processors that the distribution terminal includes, distributes the video to each terminal of the plurality of viewing terminals, the compilation server transmits the compiled trend to the distribution terminal, the distribution terminal is configured to display information corresponding to the compiled trend, the compilation server repeats compiling the trend to generate an updated trend and transmitting the updated trend to the distribution terminal at predetermined time intervals, and the distribution terminal is configured to display information corresponding to the updated trend.

2. The compilation system according to claim 1, wherein each terminal of the plurality of viewing terminals, when the terminal detects that one of one or more contents associated with the video in advance is being browsed while the video is being played, sends a report in which the detected content is specified to the compilation server, and the compilation server:
  receives reports sent from the plurality of viewing terminals; and
  compiles a trend in numbers of viewers, among the plurality of viewers, who have been browsing respective content of the one or more contents at certain playback times of the video.

3. The compilation system according to claim 1, wherein the provisioning server further, using at least one processor of one or more processors that the provisioning server includes:
  provides the viewing terminal with the one or more contents in a browsable manner; and
  when the provisioning server detects that one of the one or more contents is being browsed while the video is being played, sends a report in which the detected content is specified to the compilation server.

4. The compilation system according to claim 2, wherein the viewing terminal further specifies a playback time of the video at which the content was detected in the report and sends the report to the compilation server.

5. The compilation system according to claim 2, wherein the compilation server compiles a trend in numbers of viewers who have been browsing respective content of the one or more contents, based on a time at which the compilation server received the report.

6. The compilation system according to claim 1, wherein each terminal of the plurality of viewing terminals is configured to allow a specific status in the content to be updated in response to an operation performed by a viewer who uses the terminal while the video is being played in the terminal, and the compilation server:

collects that the specific status in the content has been updated while the video is being played in each terminal of the plurality of viewing terminals; and compiles a trend in numbers of viewers, among the plurality of viewers, who have caused the specific status to be update at certain playback times of the video.

7. The compilation system according to claim 6, wherein the content is a web page in an electronic market, the specific status is whether or not a product or a service is added to an electronic cart in the electronic market, and the compilation server:

collects that a product or a service has been added to the electronic cart in the web page; and compiles a trend in numbers of viewers, among the plurality of viewers, who have caused the product or the service to be added to the electronic cart at certain playback times of the video.

8. A compilation server to be connected in a communicable manner to each terminal of a plurality of viewing terminals with which a plurality of viewers respectively views a video, the compilation server comprising:

one or more processors, wherein the compilation server is connected in a communicable manner to a provisioning server that:

receives a request from at least one of the plurality of viewing terminals, wherein the request identifies at least a web page;

transmits a response to the at least one of the plurality of viewing terminals; and transmits a report specifying the web page to the compilation server based on the web page being included in an action list associated with the video the compilation server, using at least one processor of the one or more processors:

collects whether either one of one or more contents associated with the video in advance is being browsed while the video is being played in each terminal of the plurality of viewing terminals, wherein the collecting includes receiving the report from the provisioning server; and compiles a trend in numbers of viewers, among the plurality of viewers, who have been browsing respective content of the one or more contents at certain playback times of the video; and wherein the compilation server transmits the compiled trend to a distribution terminal, and the compilation server repeats compiling the trend to generate an updated trend and transmitting the updated trend to the distribution terminal at predetermined time intervals.

9. A compilation method, comprising, in a compilation system including a plurality of viewing terminals with which a plurality of viewers respectively views a video, a provisioning server, and a compilation server, by each terminal of the plurality of viewing terminals, enabling a viewer using the terminal to view one of one or more contents associated with the video in advance while the video is being played in the terminal, and by the provisioning server:

receiving a request from at least one of the plurality of viewing terminals, wherein the request identifies at least a web page;

transmitting a response to the at least one of the plurality of viewing terminals; and transmitting a report specifying the web page to the compilation server based on the web page being included in an action list associated with the video by the compilation server:

collecting whether either one of the one or more contents is being browsed while the video is being played in each terminal of the plurality of viewing terminals, wherein the collecting includes receiving the report from the provisioning server, and compiling a trend in numbers of viewers, among the plurality of viewers, who have been browsing respective content of the one or more contents at certain playback times of the video; and wherein the compilation system further comprises a distribution terminal to distribute the video, by the distribution terminal, using at least one processor of one or more processors that the distribution terminal includes, distributes the video to each terminal of the plurality of viewing terminals, by the compilation server, transmitting the compiled trend to the distribution terminal, by the distribution terminal, displaying information corresponding to the compiled trend, by the compilation server, repeating compiling the trend to generate an updated trend and transmitting the updated trend to the distribution terminal at predetermined time intervals, and by the distribution terminal, displaying information corresponding to the updated trend.

\* \* \* \* \*